(12) United States Patent
Akimoto et al.

(10) Patent No.: US 6,803,117 B2
(45) Date of Patent: Oct. 12, 2004

(54) MAGNETIC RECORDING MEDIUM WITH AN EXCHANGE LAYER STRUCTURE INCLUDING A COCRPTB FERROMAGNETIC LAYER

(75) Inventors: Hideyuki Akimoto, Kawasaki (JP); Kenji Sato, Kawasaki (JP); Yuki Yoshida, Kawasaki (JP); Masaya Suzuki, Kawasaki (JP); Akira Kikuchi, Higashine (JP); Tohru Horie, Higashine (JP); Naoya Saito, Higashine (JP); Akiko Honda, Higashine (JP)

(73) Assignee: Fujitsu Limited, Kawasaki (JP)

( * ) Notice: Subject to any disclaimer, the term of this patent is extended or adjusted under 35 U.S.C. 154(b) by 11 days.

(21) Appl. No.: 10/166,880

(22) Filed: Jun. 11, 2002

(65) Prior Publication Data

US 2003/0059648 A1 Mar. 27, 2003

(30) Foreign Application Priority Data

Sep. 26, 2001 (JP) ........................................ 2001-294599

(51) Int. Cl.$^7$ ............................... G11B 5/65; G11B 5/66
(52) U.S. Cl. ........................ 428/611; 428/637; 428/664; 428/665; 428/667; 428/678; 428/141; 428/163; 428/216; 428/336; 428/409; 428/694 TS; 428/694 TM; 428/694 TR; 428/694 SG
(58) Field of Search ................................ 428/664, 665, 428/611, 637, 666, 667, 668, 678, 687, 65.3, 65.7, 141, 163, 167, 212, 216, 336, 409, 694 TS, 694 TM, 694 TR, 694 SG

(56) References Cited

U.S. PATENT DOCUMENTS

2001/0031383 A1 * 10/2001 Sakawaki et al. ...... 428/694 TS
2002/0037441 A1 * 3/2002 Okuyama et al. ...... 428/694 TS
2002/0055017 A1 * 5/2002 Fukushima et al. ... 428/694 SG

FOREIGN PATENT DOCUMENTS

| JP | 05-197941 | | 8/1993 |
| JP | 08-31638 A | * | 2/1996 |
| JP | 11-339240 | | 12/1999 |
| JP | 2001-056924 | | 2/2001 |
| JP | 2001-148110 | | 5/2001 |
| JP | 2002-100018 A | * | 4/2002 |
| WO | WO 97/26391 | | 7/1997 |

OTHER PUBLICATIONS

Derwent Abstract Translation of JP 08–031638 A (Derwent Acc. No. 1996–144358).*
JPO Abstract Translation of JP 2002–100018 A (JPO Doc. ID JP 200210018 A).*
Machine Translation of JP 08–031638 A.*
Machine Translation of JP 2001–056924 A.*

* cited by examiner

Primary Examiner—Kevin M. Bernatz
(74) Attorney, Agent, or Firm—Greer, Burns & Crain, Ltd.

(57) ABSTRACT

A magnetic recording medium for high areal recording density that has excellent thermal fluctuation resistance and recording/reproduction characteristics, and a method of producing the same. The magnetic recording medium includes a glass substrate, an NiP layer having an oxide film on its surface provided on the glass substrate, a ground layer provided on the NiP layer, and a nonmagnetic intermediate layer provided on the ground layer. The magnetic recording medium further includes an exchange layer structure composed of a ferromagnetic layer and a nonmagnetic coupling layer provided on the nonmagnetic intermediate layer, and a magnetic recording layer provided on the exchange layer structure. The oxide film on the NiP layer is formed by introducing a small quantity of oxygen into a vacuum chamber of a sputter device. The formation and oxidation of the NiP layer are conducted at a temperature of not less than 140° C.

9 Claims, 5 Drawing Sheets

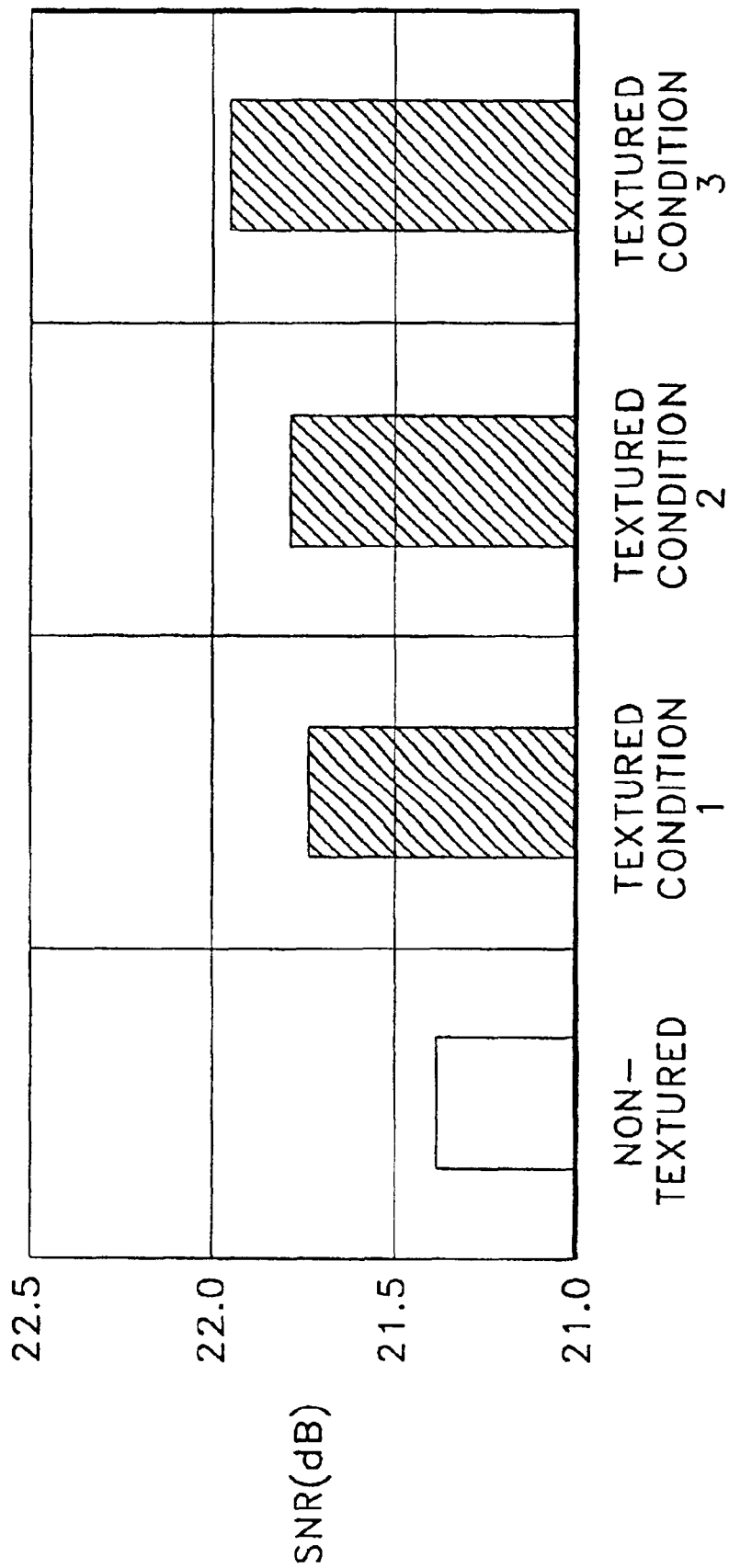

MAGNETIC RECORDING MEDIUM WITH AN EXCHANGE LAYER STRUCTURE INCLUDING A COCRPTB FERROMAGNETIC LAYER

BACKGROUND OF THE INVENTION

The present invention relates generally to a magnetic recording medium and to a method of producing the same, and particularly to a magnetic recording medium with high areal recording density that has excellent thermal fluctuation resistance characteristics and an enhanced signal-to-noise ratio (S/N ratio), as well as to a method of producing the same.

Because of their random access capabilities, magnetic disks have been widely used as external information storage media for computers and the like. In particular, Hard Disk Drives (HDD) using a hard material such as aluminum or glass as a substrate have been widely used because of their excellent response properties and large storage capacity. Particularly, in magnetic disk devices for mobile personal computers with a diameter of 2.5 inches, glass substrates that are high in hardness and less liable to plastic deformation are widely used with the main purpose of providing improvements in shock resistance. Additionally, in magnetic disk devices for desk-top personal computers, very smooth glass substrates (resulting from their high hardness) have gradually come to be used in place of aluminum substrates.

In magnetic disk devices, various approaches have been tried to enhance the areal recording density. When enhancing the areal recording density of magnetic recording media, it is also necessary to reduce the medium noise and to enhance the signal-to-noise ratio (S/N ratio). Some of the most effective methods of reducing the medium noise include refining and uniformizing magnetic particles, which are the minimum recording elements in the magnetic recording media, and magneticably isolating the magnetic particles.

However, with advances in refining and isolating the magnetic particles, there arises the problem of an increase in a phenomenon in which magnetic information recorded on the magnetic recording medium is attenuated due to external thermal energy. Such a phenomenon is called the thermal fluctuation effect or thermal decay.

The magnitude of the thermal fluctuation effect is generally considered to be determined by the magnitude of $K_U V/k_B T$, and the thermal fluctuation becomes more conspicuous as the value of $K_U V/k_B T$ decreases, where $K_U$ is a magnetic anisotropy constant, V is the average volume of the magnetic particles, $k_B$ is Boltzmann's constant, and T is temperature. The value of $K_U V/k_B T$ is also called the thermal stabilization constant.

Japanese Patent Laid-open No. 2001-56924 and Japanese Patent Laid-open No. 2001-148110 disclose examples of mediums that have thermal fluctuation resistance with an enhanced S/N ratio. These magnetic recording mediums each include an exchange layer structure composed of a nonmagnetic coupling layer and a ferromagnetic layer, in addition to a magnetic recording layer.

In a magnetic recording media with a glass substrate, in order to provide a medium having a high coercive force (Hc), the substrate temperature must be maintained at a high value when forming the magnetic film. Japanese Patent Laid-open No. Hei 5-197941 (1993) and Japanese Patent Laid-open No. Hei 11-339240 (1999) each disclose a technique of sequentially forming a Cr adhesive layer, an NiP layer, a Cr underlayer and a magnetic recording layer on a glass substrate.

In addition, in response to the demand for increasing the recording density and decreasing the flying height of the magnetic head, there is also known a technique of subjecting an NiP layer to a mechanical texturing treatment after forming the NiP layer on a glass substrate by sputtering. The main purposes of such a procedure are to refine the magnetic particles, enhance the magnetic anisotropy, and prevent stiction of the magnetic head.

Thus, when using a glass substrate as a substrate, it is the general practice to form a Cr adhesive layer and an NiP layer on the glass substrate, and to then subject the surface of the NiP layer to a texturing treatment. However, in order to conduct the texturing treatment after formation of the NiP layer, it is normally necessary to first remove the glass substrate from the vacuum film-forming chamber of the sputtering device and bring it into the atmosphere prior to conducting the texturing treatment. On the other hand, when growing the NiP layer on the glass substrate by a plating method, the surface of the NiP layer necessarily comes into contact with the atmosphere and is oxidized in the process of moving the substrate into a vacuum chamber for forming the magnetic recording layer.

Thus, in each of the above cases, according to the conventional methods of producing a magnetic recording medium, the production process is divided into two processes. Namely, a first process of the steps up to and including forming the NiP layer on the glass substrate, and a second process of forming the magnetic recording layer. Generally, after the first process is completed, the medium is removed from the first chamber (at which point the medium comes into contact with the atmosphere), and it is moved into a second chamber. Thus, the production equipment and production costs are higher than they would be if all of the steps of forming the magnetic recording layer on the substrate could be accomplished within a single chamber in which the vacuum is maintained.

On the other hand, in a magnetic recording medium in which the layers from the NiP layer to the magnetic layer are successively formed on the glass substrate in a vacuum film-forming chamber, as performed in a trial investigation conducted by the applicants, good magnetic characteristics are secured to a certain extent, but the electromagnetic transformation characteristic obtained is much inferior to that of a magnetic recording medium produced through a production process divided into the above-mentioned two processes.

It is known that the above result is due to the fact that, in the case of the conventional magnetic recording medium, the glass substrate is taken out of the vacuum film-forming chamber to subject the surface of the NiP layer to the texturing treatment and, as a result, the surface of the NiP layer is oxidized, whereby the electromagnetic transformation characteristic is improved.

Accordingly, an object of the present invention is to provide a magnetic recording medium that has excellent thermal fluctuation resistance, has an enhanced S/N ratio of reproduction signals and is suitable for high areal recording density recording, as well as a method of producing the same.

In accordance with one aspect of the present invention, there is provided a magnetic recording medium that includes a substrate (preferably a glass substrate, although other materials may be used), an underlayer provided above the substrate, an exchange layer structure including a ferromagnetic layer and a nonmagnetic coupling layer, which exchange layer structure is provided above the underlayer, and a magnetic recording layer provided above the exchange layer structure. The ferromagnetic layer is preferably composed of CoCrPtB containing approximately 21 to 23 at % Cr, approximately 10 to 14 at % Pt, and approximately 3 to 5 at % B, with the remainder being Co. The magnetic recording layer is preferably composed of CoCrPtBCu containing approximately 18 to 20 at % Cr, approximately 10 to 12 at % Pt, approximately 6 to 8 at % B, and approximately 4 to 5 at % Cu, with the balance being Co.

Preferably, the medium also includes an NiP layer with an oxide film on its surface, whereby the NiP layer is provided above the substrate. The medium also preferably includes a non-magnetic intermediate layer above the underlayer.

Preferably, an adhesive layer containing Cr as a main constituent is intermediately provided between the substrate and the NiP layer. The underlayer may be divided into a first underlayer and a second underlayer, with the first underlayer being provided on the second underlayer. The first underlayer preferably contains Cr as a main constituent, and the second underlayer preferably contains CrMo as a main constituent.

Preferably, the film thickness of the first underlayer is in the range of approximately 2 to 5 nm, the film thickness of the second underlayer is in the range of approximately 2 to 6 nm, and the total film thickness of the first and second underlayers is in the range of approximately 5 to 10 nm.

Preferably, the substrate has a surface that is textured so as to have a multiplicity of grooves extending in the circumferential direction. The textured surface preferably has an average roughness of not more than 0.4 nm, a number of the grooves of not less than 15 per $\mu$m, with the average depth of the grooves being not more than 2 nm.

In accordance with another aspect of the present invention, there is provided a method of producing a magnetic recording medium including the steps of: forming an NiP layer on a substrate in a first vacuum sub-chamber, oxidizing the NiP layer in a second vacuum sub-chamber, forming an underlayer on the oxidized NiP layer in a third vacuum sub-chamber, forming a nonmagnetic intermediate layer having an hcp structure on the underlayer in a fourth vacuum sub-chamber, forming a ferromagnetic layer on the nonmagnetic intermediate layer in a fifth vacuum sub-chamber, forming a nonmagnetic coupling layer on the ferromagnetic layer in a sixth vacuum sub-chamber, and forming a magnetic recording layer on the nonmagnetic coupling layer in a seventh sub-vacuum chamber. Preferably, at least the steps conducted in at least the first, second and third vacuum sub-chambers are all performed without breaking the vacuum. More preferably, all of the steps are performed without breaking the vacuum. Additionally, the ferromagnetic layer is preferably composed of CoCrPtB containing approximately 21 to 23 at % Cr, approximately 10 to 14 at % Pt, and approximately 3 to 5 at % B, with the remainder being Co. Finally, the magnetic recording layer is preferably composed of CoCrPtBCu containing approximately 18 to 20 at % Cr, 10 to 12 at % Pt, 6 to 8 at % B, and 4 to 5 at % Cu, with the remainder being Co.

Preferably, the formation and oxidation of the NiP layer are conducted at a temperature of not less than 140° C. Also, the method of producing a magnetic recording medium preferably includes the step of subjecting the surface of the substrate to texturing so as to provide a multiplicity of grooves in the circumferential direction. The surface of the glass substrate preferably has an average roughness of not more than 0.4 nm, a number of the grooves of not less than 15 per $\mu$m, and an average depth of the grooves of not more than 2 nm. Preferably, the step of oxidizing the NiP layer is conducted under an oxygen gas partial pressure in the range of approximately 0.1 to 0.6 Pa.

In accordance with a further aspect of the present invention, there is provided a method of producing a magnetic recording medium including the steps of: forming an NiP layer above a substrate while introducing oxygen into a first vacuum sub-chamber, forming an underlayer above the NiP layer in a second vacuum sub-chamber, forming a ferromagnetic layer above the underlayer in a third vacuum sub-chamber, and forming a magnetic recording layer above the ferromagnetic layer in a fourth vacuum sub-chamber. The ferromagnetic layer is preferably composed of CoCrPtB containing approximately 21 to 23 at % Cr, approximately 10 to 14 at % Pt, and approximately 3 to 5 at % B, with the remainder being Co. The magnetic recording layer is preferably composed of CoCrPtBCu containing approximately 18 to 20 at % Cr, approximately 10 to 12 at % Pt, approximately 6 to 8 at % B, and approximately 4 to 5 at % Cu, the remainder being Co.

Preferably, the step of forming the NiP layer is conducted in a gas mixture of argon and oxygen containing not less than approximately 5% of oxygen. Preferably, the formation of the NiP layer is conducted at a temperature of not less than approximately 140° C.

BRIEF DESCRIPTION OF THE DRAWINGS

FIG. 8 is a diagram showing variation of SNR of a non-textured glass substrate and textured glass substrates.

DETAILED DESCRIPTION OF THE PREFERRED EMBODIMENTS

Figure 1:
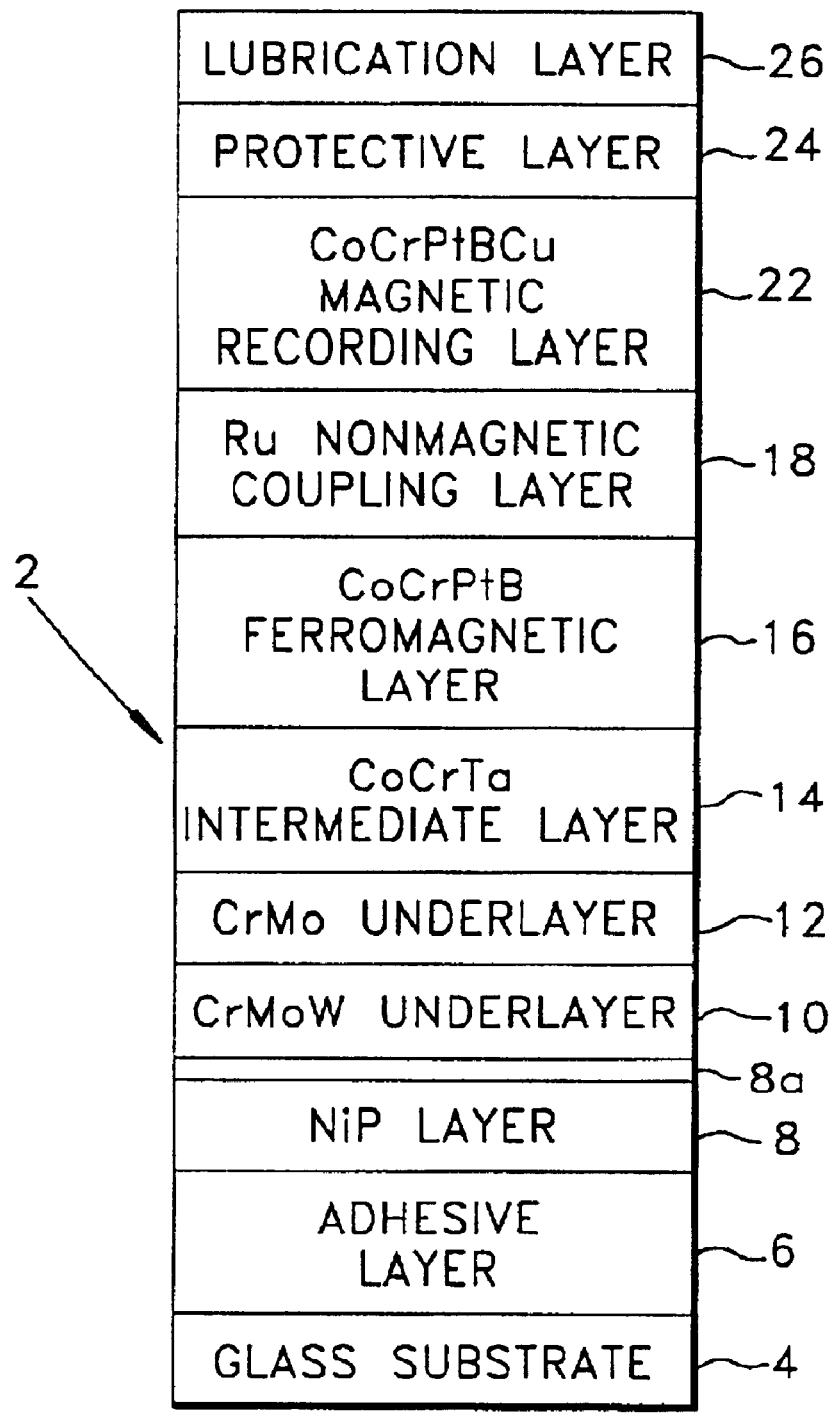
FIG. 1 is a general view of the layers of a magnetic recording medium according to an embodiment of the present invention.

A method of producing a magnetic recording medium 2 according to an embodiment of the present invention will be described below. FIG. 1 is a sectional constitutional view of the magnetic recording medium 2 produced by the method described.

First, a glass substrate 4 composed of a tempered glass or crystallized glass or the like is cleaned. After cleaning, the glass substrate is introduced into a magnetron sputter device, and the glass substrate 4 is heated to about 220° C. as a first-stage heating.

Next, a Cr adhesive layer 6 is grown to a film thickness of 25 nm on the glass substrate 4 in a vacuum film-forming chamber having a target of Cr, and then an $NiP_{19}$ layer 8 is grown to a film thickness of 25 nm in another vacuum film-forming chamber having an $NiP_{19}$ target.

Subsequently, the glass substrate 4 is contained in a vacuum chamber provided independently, and a small quantity of oxygen is introduced to oxidize the surface of the NiP$_{19}$ layer 8. The oxidation is conducted by introducing pure oxygen into the chamber at a pressure of about 0.17 Pa for about 6 seconds. By this treatment, an oxide film 8a is formed on the surface of the NiP$_{19}$ layer 8.

Next, the glass substrate 4 is moved into another sub-chamber within the vacuum chamber, and the glass substrate 4 is heated to 260° C. (Ts2) as a second-stage heating. Then, a CrMo$_{2.5}$W$_{2.5}$ underlayer 10 is grown to a film thickness of 3 nm in a vacuum film-forming chamber having a CrMo$_{2.5}$W$_{2.5}$ target, and, further, a CrMo$_{25}$ underlayer 12 is grown to a film thickness of 5 nm in a vacuum film-forming chamber having a CrMo$_{25}$ target. The underlayers 10 and 12 preferably have a bcc structure.

Next, the glass substrate 4 is introduced into a vacuum film-forming sub-chamber having a CoCr$_{13}$Ta$_5$ target, and a CoCr$_{13}$Ta$_5$ nonmagnetic intermediate layer 14 is grown to a film thickness of 1 nm. The nonmagnetic intermediate layer 14 is provided for epitaxial growth of a magnetic recording layer 22 (to be formed later), for a reduction in particle distribution width, and for orientation of an axis of easy magnetization of the magnetic recording layer 22 along a plane parallel to the recording surface of the magnetic recording medium. The nonmagnetic intermediate layer 14 preferably has an hcp structure.

Next, the glass substrate 4 is introduced into a vacuum film-forming sub-chamber having a CoCr$_{22}$Pt$_{13}$B$_4$ target, and a CoCr$_{22}$Pt$_{13}$B$_4$ ferromagnetic layer 16 is grown to a film thickness of 5 nm. Further, the glass substrate 4 is introduced into a vacuum film-forming sub-chamber having a Ru target, and a Ru nonmagnetic coupling layer 18 is grown to a film thickness of 0.8 nm.

Generally, the nonmagnetic coupling layer 18 has a film thickness of 0.4 to 1.0 nm, and preferably it has a film thickness of 0.6 to 0.8 mm. By setting the film thickness of the nonmagnetic coupling layer 18 in such a range, the magnetization directions of the ferromagnetic layer 16 and the magnetic recording layer 22 formed later become anti-parallel. The ferromagnetic layer 16 and the nonmagnetic coupling layer 18 constitute an exchange layer structure 20.

Subsequently, the glass substrate 4 is introduced into a vacuum film-forming sub-chamber having a CoCr$_{19}$Pt$_{10}$B$_7$Cu$_4$ target, and a CoCr$_{19}$Pt$_{10}$B$_7$Cu$_4$ magnetic recording layer 22 is grown to a film thickness of 15 nm. Further, a protective layer 24 consisting of C is formed, and a lubrication layer 26 consisting of an organic lubricant is formed on the protective layer 24.

The composition of the materials above are all expressed in at %. The film formations were conducted by treatments in an Ar gas atmosphere in vacuum film-forming sub-chambers (vacuum process sub-chambers) that are respectively provided independently, and by successively treating the substrate without breaking the vacuum. The above-described film formations were made to be standard conditions, and a variety of magnetic recording media were also produced for comparison.

Table 1 shows the comparative results of the magnetic characteristics and the recording/reproduction characteristics between the case in which the oxidation process is performed after formation of the NiP layer, and the case in which the oxidation process is absent.

TABLE 1

| Oxidation process | Present | Absent |
|---|---|---|
| Coercive force Hc | 3680 Oe | 3620 Oe |
| SNR | 21.4 dB | 12.3 dB |

The magnetic characteristics of the medium subjected to oxidation and the medium not subjected to oxidation were respectively 3680 oersted (Oe) and 3620 oersted (Oe), and there is little difference therebetween. However, the signal-to-noise ratio (SNR) of the medium subjected to oxidation was 21.4 dB, and the SNR of the medium not subjected to oxidation was 12.3 dB. Thus, there is a large difference between the SNR of each case.

The oxidation process of the medium shown in Table 1 is, as described above, carried out by introduction of pure oxygen at a pressure of 0.17 Pa into the vacuum sub-chamber (oxidation process sub-chamber) for 6 seconds. On the other hand, the medium that was not subjected to the oxidation process was also passed through the oxidation process sub-chamber (without being oxidized), and with the degree of vacuum in the oxidation process chamber being about $1 \times 10^{-4}$ Pa.

Incidentally, the degree of background vacuum reached in the oxidation process sub-chamber in terms of vacuum capability is not more than about $1 \times 10^{-5}$ Pa. In the process of producing the magnetic recording medium, however, Ar is used as an NiP film-forming process gas in the NiP layer forming sub-chamber adjacent to the oxidation process, so that the degree of vacuum in the oxidation process chamber is slightly lower.

For comparison with the two types of mediums represented in Table 1, a third type of medium was also produced. For this third type of medium, a Cr adhesive layer 6 and an NiP layer 8 were formed on a glass substrate with respective film thicknesses of 25 nm at a substrate temperature of 220° C., and then the substrate was taken out into the atmosphere. After the substrate was cleaned, a CrMoW ground layer 10 and upper layers were formed in the same process as above at a substrate temperature of 260° C., thereby producing a magnetic recording medium with magnetic characteristics of 3680 oersted (Oe) and an SNR of 21.1 dB.

Once the substrate was taken out into the atmosphere, it made contact with oxygen, thereby oxidizing the surface of the NiP layer. Therefore, it may be considered that there is an oxidation process for this third type of medium. It was found that this third type of medium showed characteristics that were roughly equivalent to those of the medium that was subjected to the oxidation process of Table 1 above. After many trial productions, it was found that the SNR characteristics of the medium subjected to the oxidation process in the vacuum chamber (oxidation process sub-chamber) were better than those of the medium subjected to the atmospheric oxidation process by about 0.5 dB.

In the case of the conventional medium in which the NiP layer, is oxidized in the atmosphere, two sputter devices are necessary—one for forming the Cr adhesive layer and the NiP layer, and another one for forming the CrMoW ground layer and the upper layers.

Although the production of a magnetic recording medium is usually carried out in a clean room, the clean room may, however, contain a little dust, and therefore recleaning of the substrate may be necessary in cases where there is a time lapse between formation of the Cr adhesive layer and the NiP layer and formation of the CrMoW ground layer and the upper layers, due to maintenance periods and the like.

As a result, in cases where the NiP layer is oxidized in the atmosphere by removing the glass substrate from the sputter device, the production capability is reduced to one half or below as compared to the process that lacks atmospheric oxidation, and therefore the production cost of the medium is increased by such atmospheric oxidation. In contrast, the production method according to the present invention is a production method in which the layers up to the magnetic recording layer 22 are successively formed on the glass substrate 4 within a vacuum chamber, including the oxidation process of the NiP layer. Such a process is advantageous as compared to the conventional medium subjected to the atmospheric oxidation process.

Figure 2:
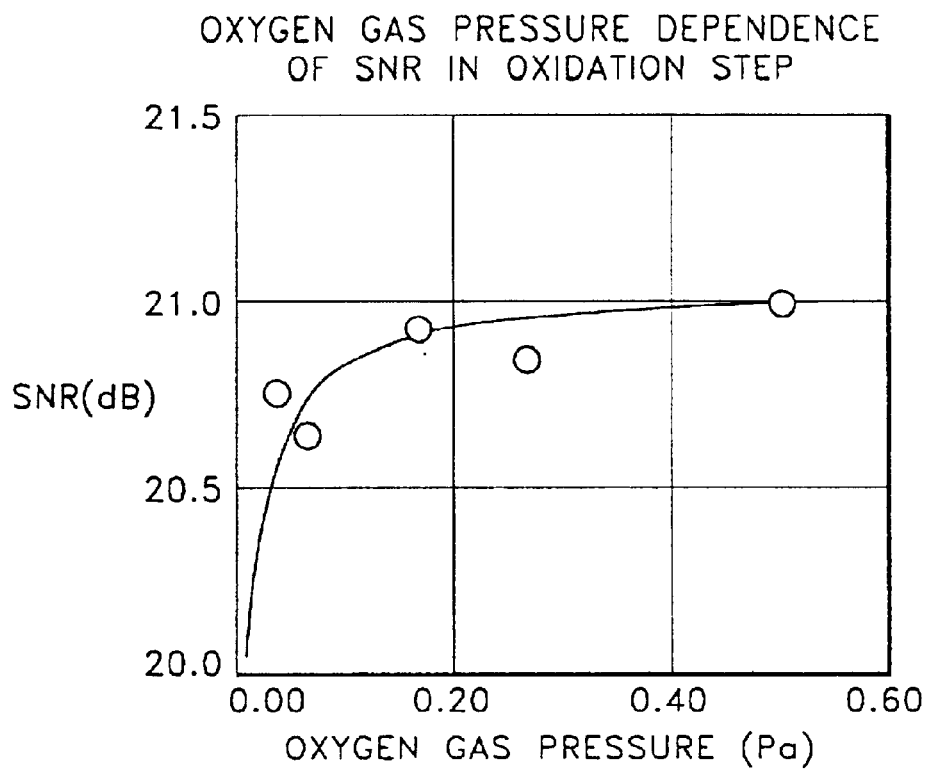
FIG. 2 is a diagram showing oxygen gas pressure dependence of SNR in an oxidation step.

FIG. 2 shows oxygen gas pressure dependence of the SNR in the oxidation step of the NiP layer. The oxygen introduction time is 6 seconds, and the media used for FIG. 2 are the same as those made with the conventional film-forming process, except for the oxygenation process and the film constitution.

It can be seen from FIG. 2 that the SNR deteriorates if the oxygen gas pressure is less than approximately 0.1 Pa, and therefore an oxygen gas pressure of at least approximately 0.1 Pa is needed. On the other hand, when the oxygen gas pressure is too high, the coercive force has a tendency to be lowered, presumably because oxygen leaks to the other vacuum film-forming chambers. Therefore, the upper limit of the oxygen gas pressure is about 0.6 Pa.

Oxidation time dependence of SNR was also investigated, and it has been found that an oxidation time of about 2 sec is sufficient to yield a medium with equivalent SNR characteristics. Incidentally, the media shown in FIG. 2 were produced with low temperature first-stage heating. Namely, the glass substrate was heating to a temperature of 120° C. Media produced with such a low temperature first-stage heating process are slightly inferior in SNR characteristics to the media subjected to the oxidation process shown in Table 1, where a higher temperature first-stage heating process was used.

Figure 3:
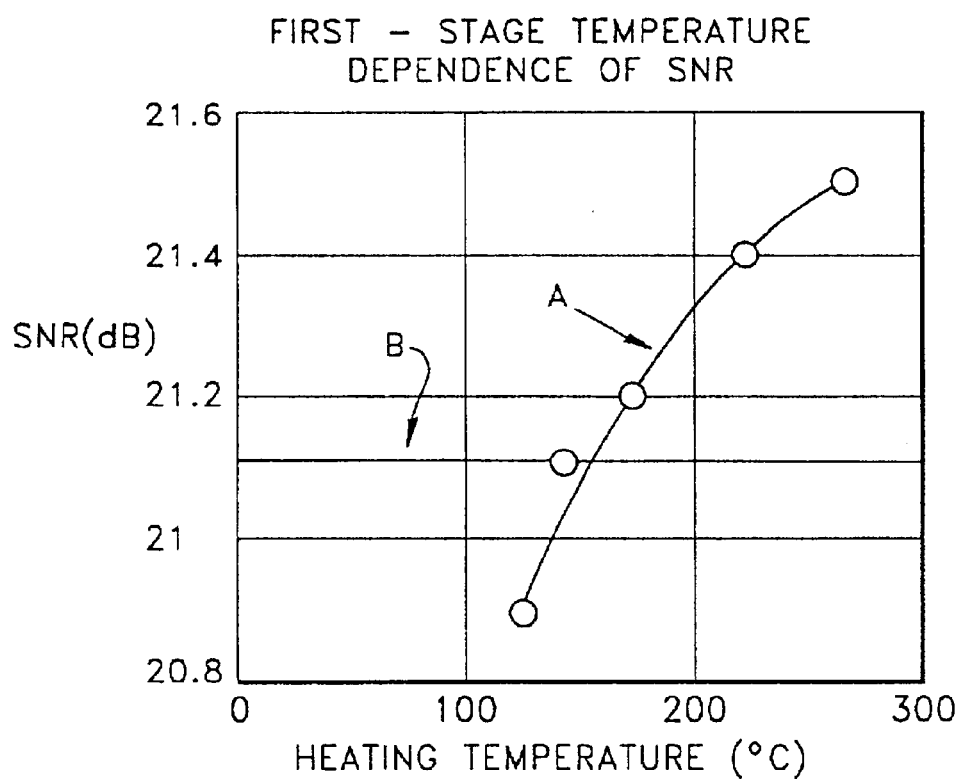
FIG. 3 is a diagram showing first-stage heating temperature dependence of SNR.

FIG. 3 shows the first-stage heating temperature dependence of SNR. Curve A represents a medium subjected to a vacuum oxidation process according to an embodiment of the present invention, and Curve B represents a medium subjected to an atmospheric oxidation process. It can be seen from FIG. 3 that increasing the first-stage heating temperature enhances the SNR under the vacuum oxidation process. However, with an atmospheric oxidation process, changing the heating temperature had no effect on the SNR. In addition, when the first-stage heating temperature is greater than 140° C., a better SNR is obtained than that of the medium subjected to an atmospheric oxidation process.

Figure 4:
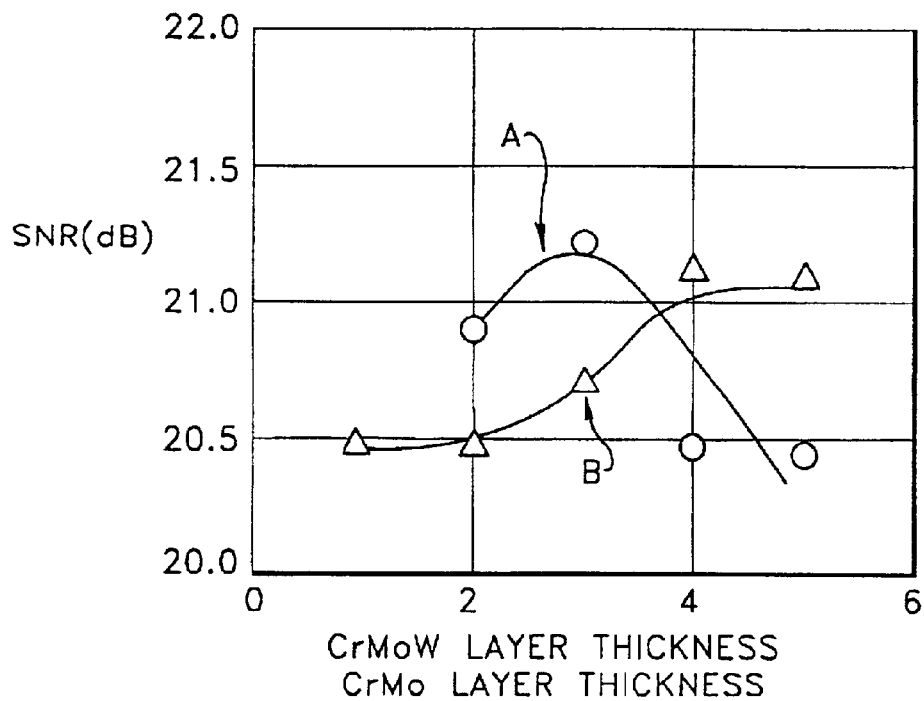
FIG. 4 is a diagram showing first ground film thickness and second ground film thickness dependences of SNR.

FIG. 4 shows the dependence of the SNR upon the first underlayer thickness ($CrMo_{2.5}W_{2.5}$) and the second underlayer thickness ($CrMo_{25}$). Curve A is the case where the thickness of the $CrMo_{25}$ layer is fixed at 2 nm and the film thickness of $CrMo_{2.5}W_{2.5}$ layer is varied, and Curve B is the case where the film thickness of the $CrMo_{2.5}W_{2.5}$ layer is fixed at 4 nm and the film thickness of the $CrMo_{25}$ layer is varied. As is clear from FIG. 4, the SNR is maximized when the $CrMo_{2.5}W_{2.5}$ film thickness is about 3 nm (when the $CrMo_{2.5}$ layer is held to a constant 2 nm), and the SNR is maximized when the $CrMo_{25}$ film thickness is about 5 nm (when the $CrMo_{2.5}W_{2.5}$ layer is held to a constant 4 nm).

Generally, a medium with a good SNR comprises magnetic particles with enhanced refining, uniformity and magnetic isolation, and, accordingly, such a medium is usually weak in thermal fluctuation resistance. The thermal fluctuation resistance of the medium subjected to the oxidation process shown in Table 1 was examined, and was found to be not more than 3% in 10 years at an intermediate linear record density (one half of the maximum record density) of a magnetic disk device having an areal recording density of 39 $Gb/in^2$. Namely, the medium was found to be an extremely stable medium.

Incidentally, thermal fluctuation is proportional to logarithm of time. Therefore, a signal of about 330 kFIC (330×16/17 kbpi) was recorded on a spin stand tester, the variation of signal output was measured from 1 sec to 1000 sec after recording, and the signal attenuation amount after 10 years was estimated from the gradient of the measured data.

Table 2 shows the variation of the SNR with the composition of the magnetic recording layer.

TABLE 2

| Film constitution | CoCrPtBCu<br>Ru(0.8)<br>$CoCr_{22}Pt_{13}B_4(5)$<br>$CoCr_{19}Ta_5(1)$<br>$CrMo_{25}(5)$<br>$CrMo_{2.5}W_{2.5}(3)$<br>$NIP_{19}(25)$<br>$Cr(25)$ | → | $CoCr_{17}Pt_{10}B_7Cu_4$<br>$CoCr_{18}Pt_{11}B_7Cu_5$<br>$CoCr_{18}Pt_{11}B_7Cu_5$<br>$CoCr_{19}Pt_{10}B_7Cu_4$<br>$CoCr_{19}Pt_{10}B_8Cu_4$<br>$CoCr_{19}Pt_{10}B_5Cu_4$<br>$CoCr_{19}Pt_{11}B_7Cu_4$<br>$CoCr_{19}Pt_{12}B_7Cu_4$<br>$CoCr_{20}Pt_{10}B_7Cu_4$<br>$CoCr_{21}Pt_{10}B_7Cu_4$ | 19.3 dB<br>20.9 dB<br>21.2 dB<br>21.4 dB<br>21.0 dB<br>21.2 dB<br>21.1 dB<br>20.8 dB<br>20.5 dB<br>19.5 dB |
|---|---|---|---|---|

Table 3 shows the variation of the SNR with the composition of the ferromagnetic layer.

TABLE 3

| Film constitution | $CoCr_{19}Pt_{10}B_7Cu_4$<br>Ru(0.8)<br>CoCrPtB(5)<br>$CoCr_{13}Ta_5(1)$<br>$CrMo_{25}(5)$<br>$CrMo_{2.5}W_{2.5}(3)$<br>$NIP_{19}(25)$<br>$Cr(25)$ | → | $CoCr_{20}Pt_{13}B_4$<br>$CoCr_{21}Pt_{13}B_4$<br>$CoCr_{22}Pt_{13}B_4$<br>$CoCr_{22}Pt_{12}B_4$<br>$CoCr_{22}Pt_{10}B_4$<br>$CoCr_{22}Pt_{9}B_4$<br>$CoCr_{22}Pt_{14}B_4$<br>$CoCr_{22}Pt_{15}B_4$<br>$CoCr_{23}Pt_{13}B_4$<br>$CoCr_{24}Pt_{13}B_4$ | 20.3 dB<br>21.1 dB<br>21.4 dB<br>21.3 dB<br>21.2 dB<br>20.8 dB<br>21.0 dB<br>20.7 dB<br>21.0 dB<br>20.2 dB |
|---|---|---|---|---|

As is clear from Table 2, it is preferable that the magnetic recording layer 22 contain approximately 18 to 20 at % Cr, approximately 10 to 12 at % Pt, approximately 6 to 8 at % B, and approximately 4 to 5 at % Cu. The remainder of the magnetic recording layer 22 is Co.

As is clear from Table 3, it is preferable that the ferromagnetic layer 16 contain approximately 21 to 23 at % Cr, approximately 10 to 14 at % Pt, and approximately 3 to 5 at % B. The remainder of the ferromagnetic layer 16 is Co.

For another embodiment of a method of producing a magnetic recording medium, the above-mentioned oxidation treatment that was performed after formation of the NiP layer was replaced by a step in which $Ar-O_2$ was used in place of Ar as the process gas in the process of forming the NiP layer, and a medium that was otherwise the same as the magnetic recording medium 2 shown in FIG. 1 was produced. In the medium according to this embodiment also, substantially the same magnetic characteristics and recording/reproduction characteristics as those of the above-described embodiment were obtained.

Figure 5:
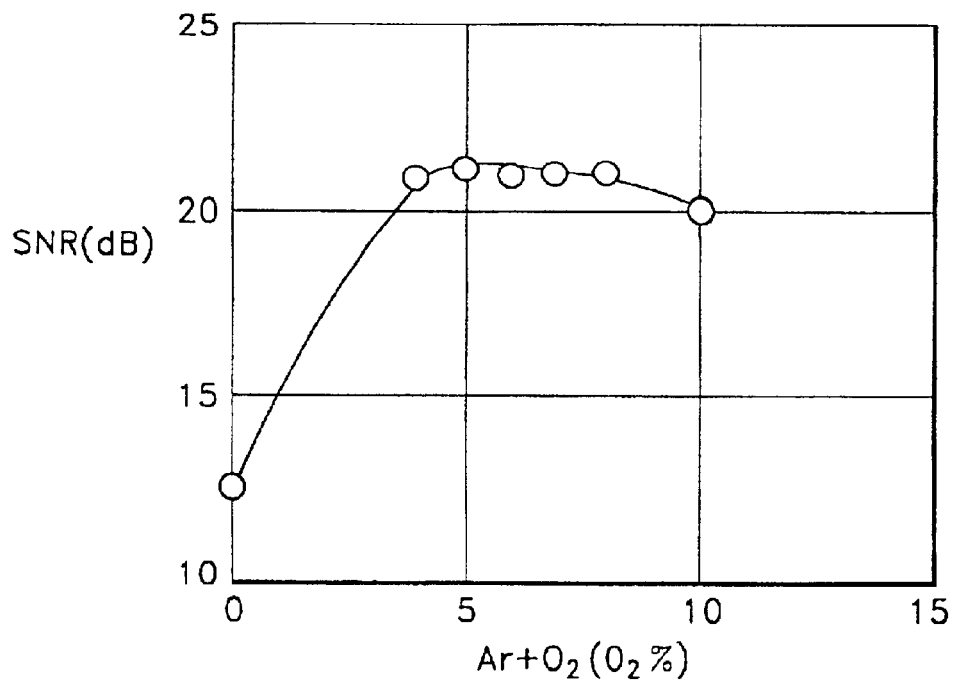
FIG. 5 is a diagram showing variation of SNR with oxygen concentration.

FIG. 5 shows how the SNR varies with the oxygen concentration in the $Ar-O_2$ gas mixture. As is clear from FIG. 5, when oxygen is present in the gas mixture in a concentration of not less than about 5%, substantially the same SNR as that of the medium subjected to an atmospheric oxidation process of the NiP layer was obtained.

Figure 6:
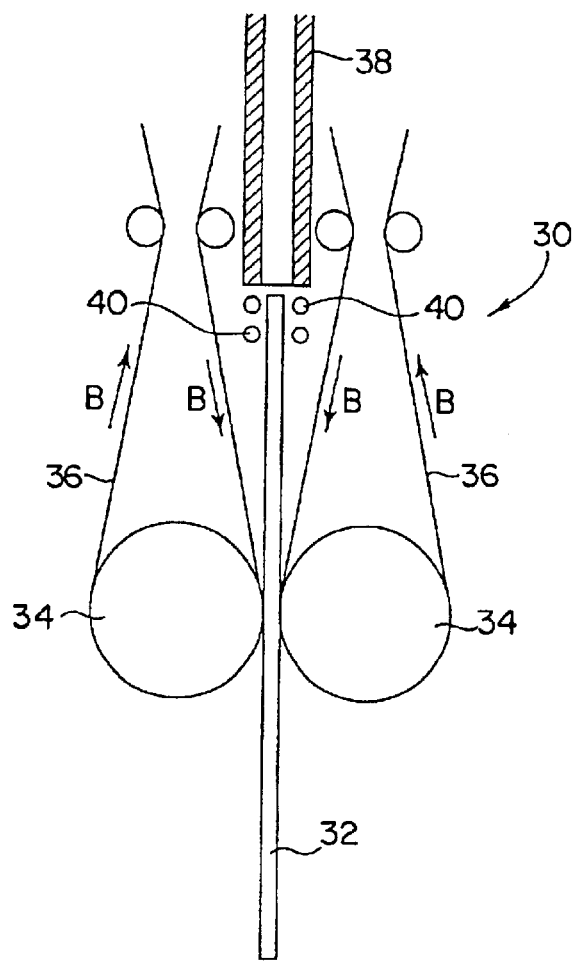
FIG. 6 is a front view of a texturing device.
Figure 7:
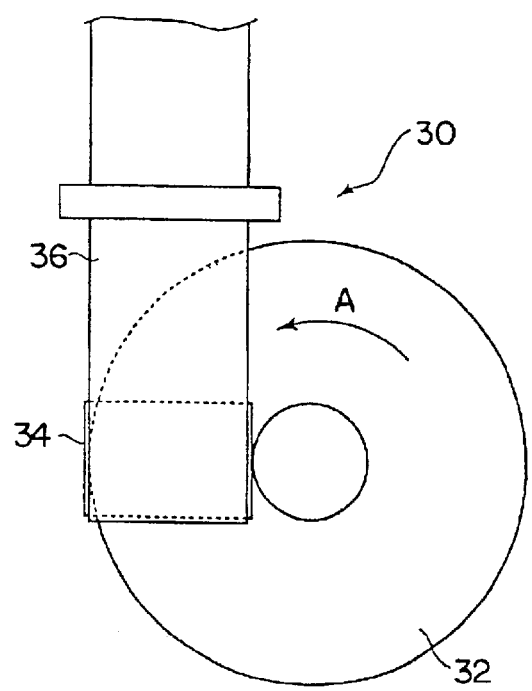
FIG. 7 is a side view of the texturing device.

Next, for a medium that was subjected to a texturing treatment of the surface of the glass substrate 4, variations of the SNR were examined when the texturing conditions were changed. FIG. 6 is a front view of a texturing device used in this experiment, and FIG. 7 is a side view of the same. It should be noted that other types of texturing devices may also be utilized.

Reference numeral 32 denotes a glass substrate, which is composed of tempered glass or crystallized glass or the like, and has sufficient strength. It should be noted that substrates of materials other than glass are contemplated as being within the scope of the invention. The texturing device 30 includes a pair of contact rollers 34 disposed on both sides of the glass substrate 32, a working tape 36 fitted around the contact rollers 34, and a working liquid supply unit 38. The working liquid 40 is preferably a dispersion of a fine diamond abrasive (or the like) in water. The diamond abrasive preferably has a grain diameter of 0.2 to 1 $\mu$m.

While dripping the working liquid 40 from the working liquid supply unit 38 onto the surface of the glass substrate 32, the glass substrate 32 is rotated in the direction of the arrow A, whereas the working tape 36 is rotated in the direction of arrow B, whereby the glass substrate 32 is textured. By this method, a multiplicity of grooves may be formed in the circumferential direction on both surfaces of the glass substrate 32.

In order to cope with reduced floatation heights of magnetic heads, the surface of the glass substrate 32 textured should have an average roughness (Ra) of not more than 0.4 nm, and the average depth of the grooves should be suppressed to be not more than 2 nm. Further, in order to achieve sufficient refining of the magnetic particles, it is suggested to form not less than 15 grooves per $\mu$m, and preferably not less than 30 grooves per $\mu$m.

Determination of the average roughness (Ra) was conducted by measuring the roughness in a region of 10 $\mu$m×10 $\mu$m by use of an atomic force microscope (AFM), and by taking the average of the measured roughness values. The definition of the number of grooves is the number of valleys counted in a section by measuring a region of 1 $\mu$m×1 $\mu$m with an AFM, and the average depth of the grooves is a computed value of the average depth of the valleys.

FIG. 8 shows the results of measurements of the SNR for magnetic recording media using a non-textured glass substrate bar and a textured glass substrate. In the figure, the left bar shows the SNR of a medium using the non-textured glass substrate, and the three other bars are the results of textured glass substrates with different texturing conditions. All of these textured substrates showed higher SNR than the case of the non-textured glass substrate. The non-textured glass substrate of this experiment was a commercially available glass substrate for high areal recording density, and upon observation of the surface with an AFM, polish streaks were observed in random directions on the substrate surface, and its average roughness (Ra) was found to be about 0.25 nm.

On the other hand, upon observation of the surfaces of the textured substrates, it was confirmed that a multiplicity of grooves were present in the circumferential direction on all the glass substrates textured under texturing conditions 1 to 3. The average roughness (Ra) of the mediums of conditions 1, 2, and 3 were about 0.23, 0.30 and 0.58 nm, respectively.

The glass substrates treated under the texturing conditions 1 and 2 have an average roughness (Ra) substantially the same as that of the commercially available glass substrate, but since they have a multiplicity of grooves in the circumferential direction due to the texturing treatment, they showed a higher SNR than the non-textured glass substrate.

As is clear from FIG. 8, a high SNR can be obtained when the surface of the glass substrate is textured to have a multiplicity of grooves in the circumferential direction.

As has been described above, according to the present invention, there can be provided, at a low cost, a magnetic recording medium that is excellent in thermal fluctuation resistance and recording/reproduction characteristics and that is also suitable for high areal recording density.

What is claimed is:

1. A magnetic recording medium comprising:
   a substrate;
   an underlayer provided above said substrate;
   an exchange layer structure including a ferromagnetic layer and a nonmagnetic coupling layer, said exchange layer structure being provided above said underlayer; and
   a magnetic recording layer provided above said exchange layer structure,
   wherein said ferromagnetic layer is CoCrPtB and said magnetic recording layer is composed of CoCrPtBCu,
   wherein said underlayer includes a first underlayer containing Cr as a main constituent thereof and contains at least one of Mo and W, and a second underlayer containing CrMo as a main constituent thereof, wherein said second underlayer is provided on said first underlayer, and
   wherein said first underlayer has a film thickness in the range of approximately 2 to 5 nm, the second underlayer has a film thickness in the range of approximately 2 to 6 nm, and the total film thickness of the first and second underlayers together is in the range of approximately 5 to 10 nm.

2. The magnetic recording medium as defined in claim 1, wherein said substrate has a textured surface defined by a multiplicity of grooves that generally extend in a circumferential direction.

3. The magnetic recording medium as defined in claim 2, wherein said textured surface has an average roughness of not more than approximately 0.4 nm, a number of said grooves of not less than approximately 15 per $\mu$m, and an average depth of said grooves of not more than approximately 2 nm.

4. The magnetic recording medium as defined in claim 1, wherein said ferromagnetic layer includes approximately 21 to 23 at % Cr, approximately 10 to 14 at % Pt, and approximately 3 to 5 at % B, with the remainder of said ferromagnetic layer being Co.

5. The magnetic recording medium as defined in claim 4, wherein said magnetic recording layer includes approximately 18 to 20 at % Cr, approximately 10 to 12 at % Pt, approximately 6 to 8 at % B, and approximately 4 to 5 at % Cu, with the remainder of said magnetic recording layer being Co.

6. The magnetic recording medium as defined in claim 1, wherein said magnetic recording layer includes approximately 18 to 20 at % Cr, approximately 10 to 12 at % Pt, approximately 6 to 8 at % B, and approximately 4 to 5 at % Cu, with the remainder of said magnetic recording layer being Co.

7. The magnetic recording medium as defined in claim 1, further comprising an NiP layer having an oxide film on a surface thereof, said NiP layer being positioned between said substrate and said underlayer.

8. The magnetic recording medium as defined in claim 7, further comprising a nonmagnetic intermediate layer provided between said underlayer and said exchange layer structure, and wherein said nonmagnetic intermediate layer contains CoCr as a main constituent thereof, and has an hcp structure.

9. The magnetic recording medium as defined in claim 7, further comprising:
   an adhesive layer containing Cr as a main constituent thereof, said adhesive layer being provided between said substrate and said NiP layer.

* * * * *